US008752396B2

(12) United States Patent
Chaudhry (10) Patent No.: US 8,752,396 B2
(45) Date of Patent: Jun. 17, 2014

(54) COMPONENT IDENTIFICATION SYSTEM AND METHOD (75) Inventor: Raheel Ashraf Chaudhry, Austin, MN (US)

(73) Assignee: Bosch Automotive Service Solutions, LLC, Warren, MI (US)

(*) Notice: Subject to any disclaimer, the term of this patent is extended or adjusted under 35 U.S.C. 154(b) by 1139 days.

(21) Appl. No.: 11/709,825

(22) Filed: Feb. 23, 2007

(65) Prior Publication Data

US 2008/0205910 A1 Aug. 28, 2008

(51) Int. Cl.
G06F 11/00 (2006.01)
G11C 29/00 (2006.01)
F25B 45/00 (2006.01)
G06F 9/445 (2006.01)
G05B 11/01 (2006.01)

(52) U.S. Cl.
USPC .............. 62/149; 714/7; 714/710; 714/723; 717/174; 717/175; 717/176; 717/177; 717/178; 700/27; 700/28

(58) Field of Classification Search
USPC .............................. 62/149; 714/7; 700/27, 28
See application file for complete search history.

(56) References Cited

U.S. PATENT DOCUMENTS

| 4,304,102 A | 12/1981 | Gray ............................... 62/195 |
| 4,364,236 A | 12/1982 | Lower et al. ....................... 62/77 |
| 4,441,330 A | 4/1984 | Lower et al. ..................... 62/149 |
| 4,448,033 A * | 5/1984 | Briccetti .......................... 62/126 |
| 4,788,637 A * | 11/1988 | Tamaru ........................ 709/221 |
| 4,984,431 A | 1/1991 | Mount et al. ..................... 62/85 |
| 5,005,369 A | 4/1991 | Manz .............................. 62/195 |
| 5,005,375 A | 4/1991 | Manz et al. ..................... 62/292 |
| 5,023,873 A * | 6/1991 | Stevenson et al. ................ 714/4 |
| 5,031,410 A | 7/1991 | Pizak et al. ........................ 62/85 |
| 5,063,749 A | 11/1991 | Manz .............................. 62/149 |
| 5,078,756 A | 1/1992 | Major et al. ...................... 55/21 |
| 5,099,653 A | 3/1992 | Major et al. .................... 62/149 |
| 5,101,233 A * | 3/1992 | Ito et al. .......................... 399/24 |
| 5,123,259 A | 6/1992 | Morgan, Sr. .................... 62/292 |
| 5,167,126 A | 12/1992 | Cartwright ...................... 62/129 |
| 5,181,388 A | 1/1993 | Abraham .......................... 62/77 |
| 5,187,940 A | 2/1993 | Paxton ............................. 62/77 |
| 5,187,953 A | 2/1993 | Mount ............................ 62/195 |

(Continued)

OTHER PUBLICATIONS

Robinair, "*Operating manual for Model 34788; Recovery, Recycling, Recharging Unit*", Nov. 30, 2006.

(Continued)

Primary Examiner — Allen Flanigan
Assistant Examiner — Filip Zec
(74) Attorney, Agent, or Firm — Baker & Hostetler LLP (57) ABSTRACT A component identification system and method, including an identifier associated with a replacement component, a memory to store one or more identifiers for each previously used component corresponding to the replacement component, and a processor to compare the identifier of the replacement component with the one or more stored identifiers of each previously used component. The replacement component is acceptable where the identifier of the replacement component differs from the one or more stored identifiers of each previously used component, and the replacement component is unacceptable where the identifier of the replacement component corresponds to one or more stored identifiers of each previously used component. Prior to accepting the replacement component, one or more predetermined validation operations can be performed on the identifier of the replacement component, with the identifier being formed in a serial number or code type scheme.

9 Claims, 6 Drawing Sheets (56) References Cited

U.S. PATENT DOCUMENTS

| | | | | |
|---|---|---|---|---|
| 5,189,882 | A | 3/1993 | Morgan, Sr. | 62/77 |
| 5,209,074 | A | 5/1993 | McConnell et al. | 62/85 |
| 5,216,612 | A * | 6/1993 | Cornett et al. | 700/96 |
| 5,226,300 | A | 7/1993 | Christensen et al. | 62/77 |
| 5,313,628 | A * | 5/1994 | Mendelsohn et al. | 714/3 |
| 5,325,675 | A | 7/1994 | Manz et al. | 62/77 |
| 5,367,886 | A | 11/1994 | Manz et al. | 62/195 |
| 5,369,959 | A | 12/1994 | Pfefferle et al. | 62/195 |
| 5,379,887 | A * | 1/1995 | Conley, Jr. | 206/232 |
| 5,388,416 | A | 2/1995 | Manz et al. | 62/85 |
| 5,400,613 | A | 3/1995 | O'Neal | 62/195 |
| 5,412,955 | A | 5/1995 | Husarik et al. | 62/85 |
| 5,425,242 | A | 6/1995 | Dunne et al. | 62/85 |
| 5,493,869 | A | 2/1996 | Shirley et al. | 62/149 |
| 5,517,825 | A | 5/1996 | Manz et al. | 62/158 |
| 5,544,492 | A | 8/1996 | Manz | 62/85 |
| 5,544,494 | A | 8/1996 | Manz | 62/292 |
| 5,555,269 | A * | 9/1996 | Friday et al. | 714/704 |
| 5,560,215 | A | 10/1996 | Talarico | 62/149 |
| 5,579,509 | A * | 11/1996 | Furtney et al. | 703/27 |
| 5,582,023 | A | 12/1996 | O'Neal | 62/195 |
| 5,664,424 | A | 9/1997 | Olds | 62/85 |
| 5,752,004 | A * | 5/1998 | Blood | 714/2 |
| 5,758,056 | A * | 5/1998 | Barr | 714/7 |
| 5,787,443 | A * | 7/1998 | Palmer | 1/1 |
| 5,801,940 | A * | 9/1998 | Russ et al. | 700/9 |
| 5,873,263 | A | 2/1999 | Chang | 62/617 |
| 6,029,472 | A | 2/2000 | Galbreath, Sr. | 62/475 |
| 6,073,110 | A * | 6/2000 | Rhodes et al. | 705/8 |
| 6,134,899 | A | 10/2000 | Brown et al. | 62/195 |
| 6,153,085 | A * | 11/2000 | Patko et al. | 205/775 |
| 6,185,945 | B1 | 2/2001 | Pfefferle et al. | 62/149 |
| 6,367,072 | B1 * | 4/2002 | Justice et al. | 717/168 |
| 6,408,637 | B1 | 6/2002 | Hanson et al. | 62/292 |
| 6,427,457 | B1 | 8/2002 | Pfefferle et al. | 62/149 |
| 6,442,963 | B1 | 9/2002 | Pfefferle et al. | 62/475 |
| 6,490,654 | B2 * | 12/2002 | Wickeraad et al. | 711/133 |
| 6,845,909 | B2 * | 1/2005 | Bong et al. | 235/385 |
| 6,952,681 | B2 * | 10/2005 | McQuade et al. | 705/28 |
| 7,016,742 | B2 * | 3/2006 | Jarrell et al. | 700/28 |
| 7,031,802 | B2 * | 4/2006 | Bash et al. | 700/214 |
| 7,104,075 | B2 | 9/2006 | Meeker | 62/77 |
| 7,979,313 | B1 * | 7/2011 | Baar | 705/26.1 |
| 2001/0034673 | A1 * | 10/2001 | Yang et al. | 705/28 |
| 2001/0047214 | A1 | 11/2001 | Cocking et al. | 700/80 |
| 2002/0032501 | A1 * | 3/2002 | Tilles et al. | 700/214 |
| 2002/0051394 | A1 | 5/2002 | Tobita et al. | 365/221 |
| 2004/0204977 | A1 * | 10/2004 | Obert | 705/8 |
| 2006/0010888 | A1 | 1/2006 | Suharno et al. | 62/149 |
| 2006/0010898 | A1 | 1/2006 | Suharno et al. | 62/292 |
| 2006/0101834 | A1 | 5/2006 | Govekar et al. | 62/149 |
| 2006/0101835 | A1 | 5/2006 | Meldahl et al. | 62/149 |
| 2006/0190342 | A1 * | 8/2006 | Dendl et al. | 705/26 |
| 2006/0236705 | A1 | 10/2006 | Govekar et al. | 62/149 |

OTHER PUBLICATIONS

SAE International, "*Surface vehicle Standard*", J2788, Issued Dec. 2006.

Robinair, Renew Refresh Reward, "*Making Green Has Never Been So Cool*", 34788, 2006.

* cited by examiner

COMPONENT IDENTIFICATION SYSTEM AND METHOD

FIELD OF THE INVENTION

The present invention relates generally to a component identification system and a method of component identification. More particularly, the present invention relates to a component identification system and method to ensure the integrity and authenticity of replacement parts or components, as well as to promote enhanced reliability by a system and method of ensuring that a previously used component is not reused in the system.

BACKGROUND OF THE INVENTION

Various apparatus and systems require the changing or replacement of component parts to ensure proper and reliable operation as, for example, the need to periodically change a filter of an apparatus or system, such as to remove particulates or moisture, to promote acceptable system operation. One area, among others, where the need to change a filter is important to maintaining proper and reliable system operation is in the area of recovery and recycling equipment, such as for systems and apparatus for recovering, recycling, or recharging mobile air conditioning (AC) systems.

Filters need to be changed after every so many recoveries in an AC recovery unit. Not changing the filter on occurrence of a specified condition or after a specified time can cause the AC recovery unit to malfunction or result in a service call. While previously in AC recovery units the process of changing filter existed, there did not exist an identifier associated with the filter, as a component or part to be replaced for ensuring the filter change.

An SAE Surface Vehicle Standard has been issued, SAE J2788, in December of 2006, to call for implementation of a method to require the end-user to change the filter of the AC recovery unit after a specified time, where the filter desiccant moisture capacity has reached an allowable limit, such as determined by an algorithm based on the recovered refrigerant or the moisture level detected. See, Section 4.1.1 of the SAE J2788 standard. Further, this SAE standard, in Section 4.1.2, identifies a need for an identification system to ensure that a new filter has been installed to reset the AC recovery unit for operation. Additionally, the SAE standard requires incorporation of a lockout feature, to prevent further operation of the unit when the end of the filter life is reached until the new replacement filter has been installed.

Accordingly, it is desirable in the AC recovery area, as well as in other areas utilizing replacement parts or components for reliable operation, to provide a method and component identification system to promote enhanced reliability by ensuring that a previously used part or component is not reused in the system or apparatus.

SUMMARY OF THE INVENTION

The foregoing needs are met, to a great extent, by the present invention, wherein in one aspect an apparatus, system and method are provided that in some embodiments promote enhanced reliability by ensuring that a previously used part or component is not reused in the system or apparatus.

More particularly, in another aspect of the invention, a component identification system and method are provided in relation to an AC recovery unit, wherein the changing the unit's filter and replacing it with a new filter promotes enhancing reliability, increasing unit lifespan and a saving of warranty repair or replacement costs. However, the component identification systems and methods of the present invention also have applicability to apparatus and systems, in addition to an AC recovery unit as, for example, where a part or component is replaced to promote maintaining safety, performance or reliability of the apparatus or system.

According to aspects of the invention, the identifier in the component identification system and apparatus of the invention, such a by a serial number/code scheme, would identify a new component, such as a filter, to software and in order to use the machine, the end-user or installer of the component would have to enter the correct serial number, such as provided or associated with the new component.

In accordance with one aspect of the present invention, a component identification system is provided, including an identifier associated with a replacement component, a memory to store one or more identifiers for each previously used component corresponding to the replacement component, and a processor to compare the identifier of the replacement component with the one or more stored identifiers of each previously used component corresponding to the replacement component. The replacement component is acceptable where the identifier of the replacement component differs from the one or more stored identifiers of each previously used component corresponding to the replacement component, and the replacement component is unacceptable where the identifier of the replacement component corresponds to one or more stored identifiers of each previously used component corresponding to the replacement component.

In accordance with another aspect of the present invention, prior to accepting the identifier of the replacement component, one or more predetermined validation operations can be performed on the identifier of the replacement component, with the identifier typically being formed in a serial number or code type scheme.

In accordance with yet another aspect of the present invention, the identifier of the replacement component is formed to include a plurality of elements, and the one or more predetermined validation operations includes performing one or more predetermined operations on one or more of the plurality of elements to determine other of the plurality of the elements of the identifier of the replacement component.

In accordance with yet still another aspect of the present invention, a component identification system includes an identifier associated with a replacement component, a memory to store one or more predetermined validation operations to determine whether the identifier associated with the replacement component is a valid identifier, and a processor to perform the one or more predetermined validation operations on the identifier of the replacement component, wherein it is determined whether the identifier of the replacement part corresponds to the valid identifier.

In accordance with yet a further aspect of the present invention, a method of component identification includes performing one or more predetermined validation operations on the identifier of the replacement component to determine whether the replacement component is acceptable.

In accordance with yet a further aspect of the present invention, a method of component identification includes comparing the identifier of the replacement component with the one or more identifiers of each previously used component corresponding to the replacement component to determine whether the replacement component is acceptable, such as where the identifier of the replacement component differs from the one or more identifiers of each previously used component corresponding to the replacement component.

In accordance with yet another aspect of the present invention, there are provided computer readable media having embodied thereon computer-executable instructions for execution of component identification methods by a processor according to aspects of the invention.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

The invention will now be described with reference to the drawing figures, in which like reference numerals refer to like parts throughout. An embodiment in accordance with the present invention provides a method and component identification system to promote enhanced reliability by ensuring that a previously used part or component is not reused in the system or apparatus More particularly, and by way of example, the component identification system and apparatus of the present invention is described in relation to an AC recovery, recycling and recharging unit, although the present invention is not limited in this regard.

Figure 1:
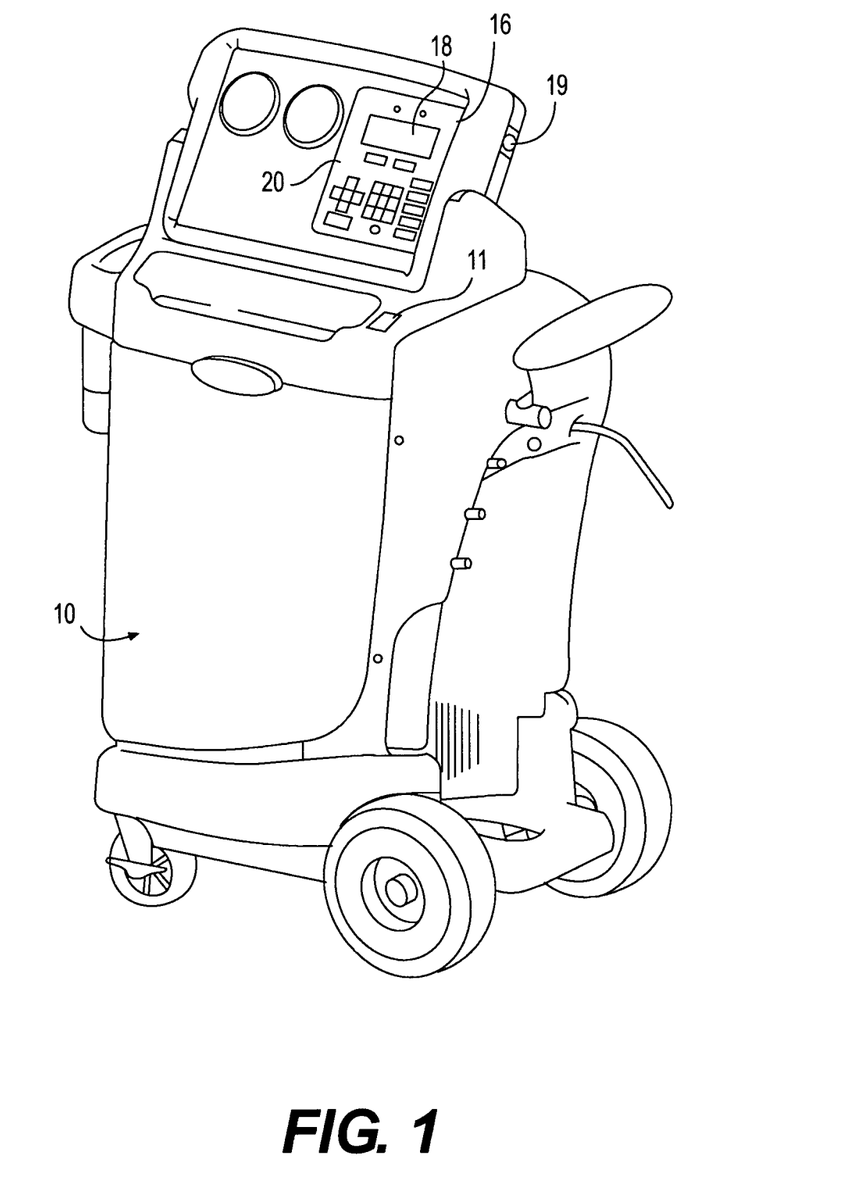
FIG. 1 is a perspective view illustrating an AC recovery unit as an example of an apparatus including replacement components or parts to which a component identification method and system of the present invention is applicable.
Figure 2:
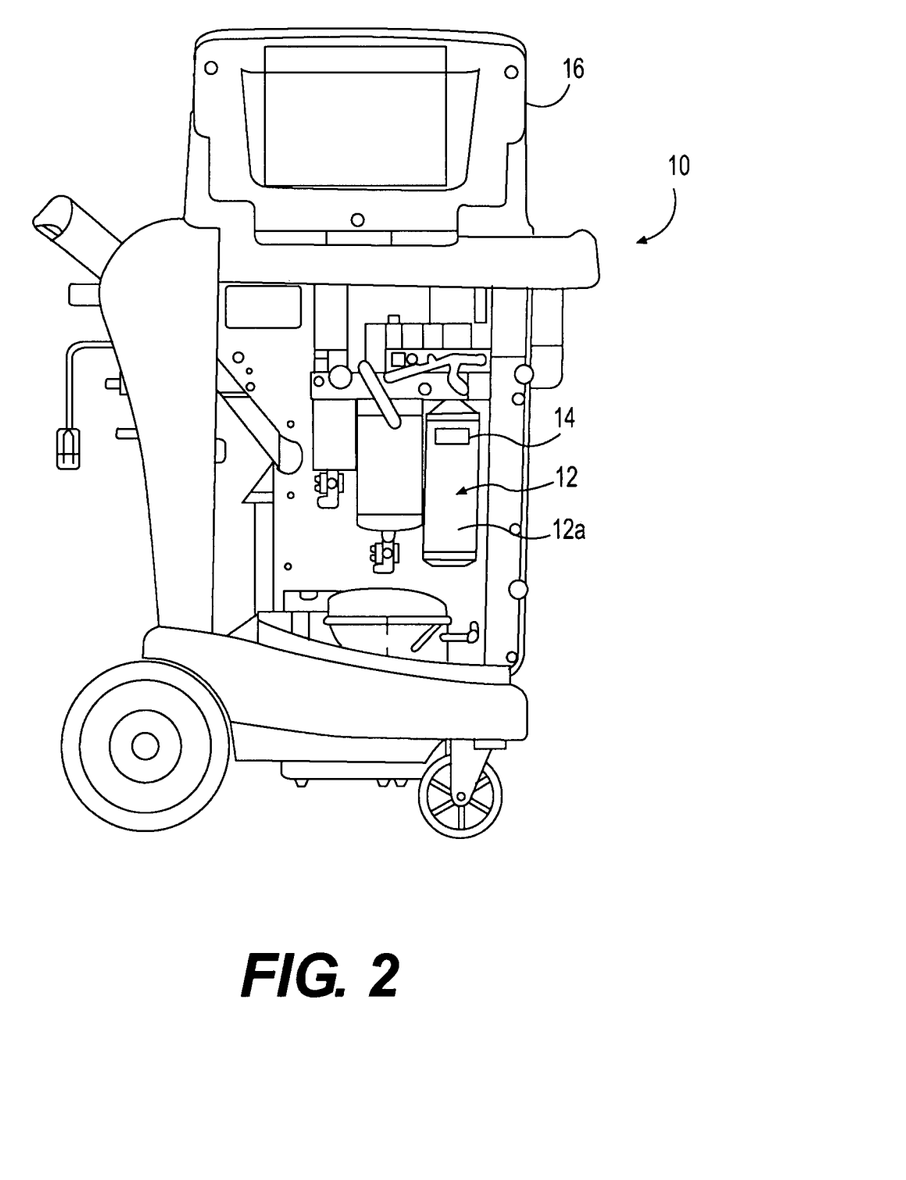
FIG. 2 is a rear, cutaway view of the AC recovery unit of FIG. 1 illustrating a replaceable part or component to which a component identification method and system of the present invention is applicable.
Figure 3:
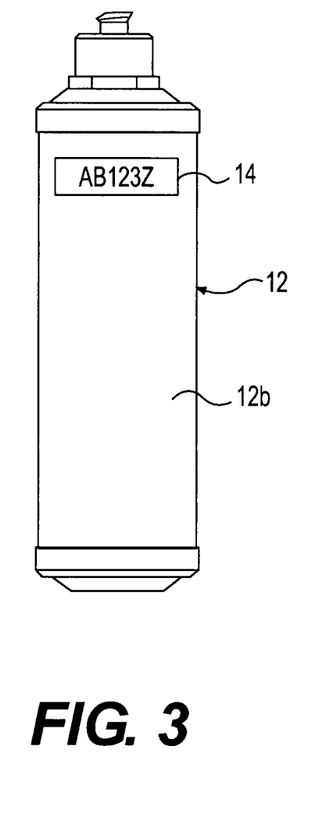
FIG. 3 is a perspective view of a filter for the AC recovery unit of FIGS. 1 and 2 illustrating an example of a replaceable part or component including an identifier to which a component identification method and system of the present invention is applicable.
Figure 4:
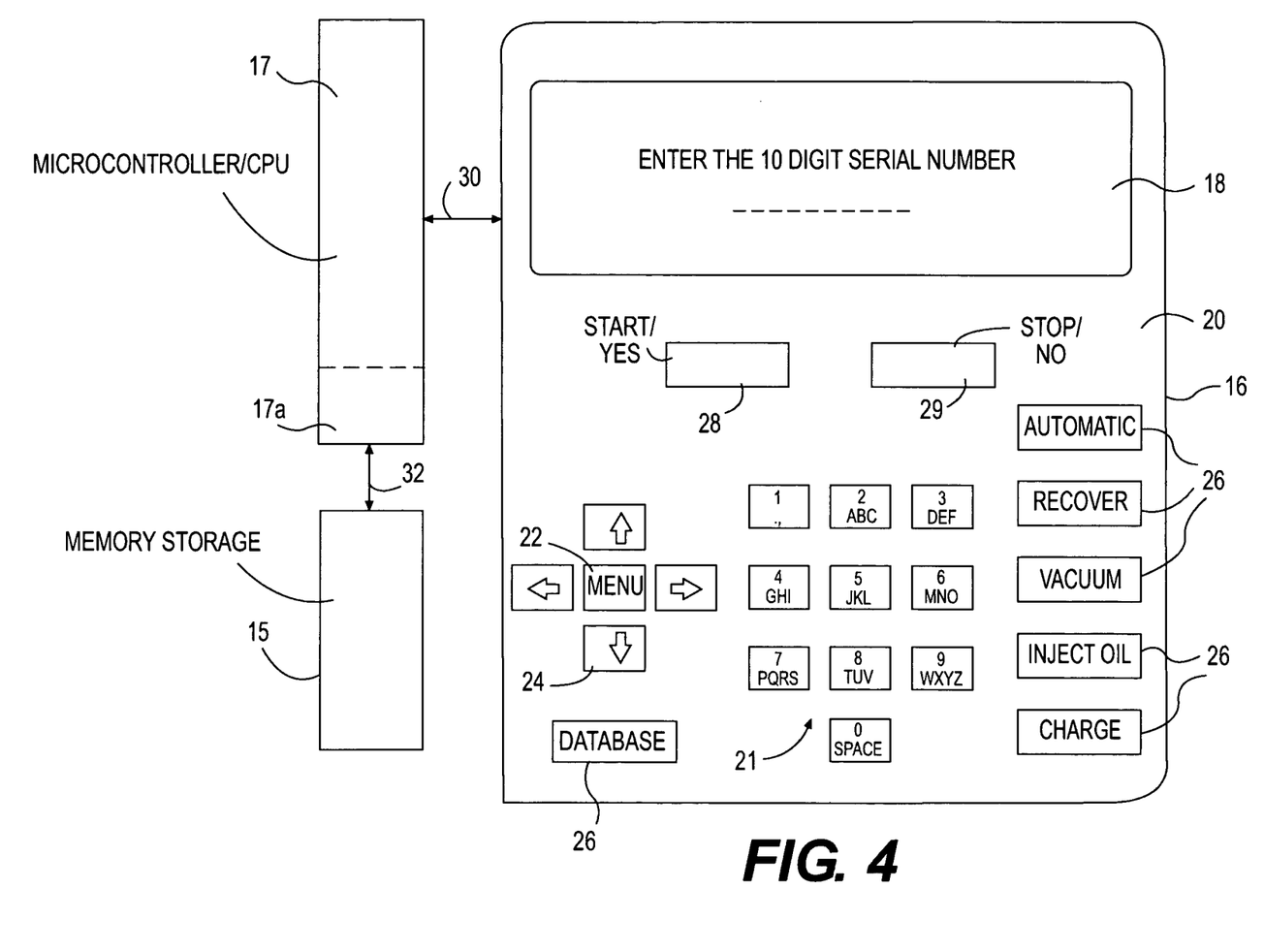
FIG. 4 is a schematic diagram of an exemplary apparatus, such as for the AC recovery unit of FIGS. 1 and 2, suitable for carrying out the functions of an embodiment of a component identification method and system of the present invention.

An embodiment for illustration of the present inventive component identification apparatus, system and method is described with reference to FIGS. 1 through 4. FIG. 1 is a perspective view illustrating an AC recovery unit 10, for example a Robinair® Model 34788 recovery, recycling, and recharging unit for the containment of R-134a refrigerant, such as used for air conditioning systems of automotive vehicles. FIG. 2 is a rear, cutaway view of the AC recovery unit 10 of FIG. 1. FIG. 3 is a perspective view of a filter 12 for the AC recovery unit of FIGS. 1 and 2. FIG. 4 is a schematic diagram of an exemplary apparatus, such as for the AC recovery unit 10 of FIGS. 1 and 2, suitable for carrying out the functions of an embodiment of a component identification method and system of the present invention, as well as other processes of the unit 10.

Referring to FIGS. 1 through 4, AC recovery unit 10 is an example of an apparatus including replacement components or parts to which a component identification method and system of the present invention is applicable. As illustrated in FIG. 2, AC recovery unit 10 includes a power on/off switch 11 for enabling operation of the unit 10, as required. Further, unit 10 includes the filter 12 having an identifier 14, as an example of a replaceable component or part to which the present invention is applicable. The replaceable filter 12 illustrated as installed on the AC recovery unit 10 is identified as filter 12a. The filter 12 typically serves as a drier and removes acid, particulates and moisture from the refrigerant. An example of a filter-drier 12 is a Robinair® No. 34724 filter-drier, for example.

The AC recovery unit 10 includes a control panel 16 for operation of the unit 10. The control panel 16 includes a display 18, such as a digital display, to provide a visual interface for viewing and monitoring by an operator various functions and operations of the unit 10.

The display 18 can be any type display, including for example but not limited to, a liquid crystal display (LCD), organic light emitting diode (OLED), field emission display (FED), electroluminescent display (ELD), etc. In addition, the LCD, for example, can be touch screen that both displays and performs the additional task of interfacing between the user and the AC recovery unit 10.

Further, the control panel 16 of the unit 10 includes a database input, interface or port 19, such as an expansion slot or a port. The database input or port 19 receives, communicates or supplies information, data, processes or programmable operations, or other information, to a memory storage unit 15 for communication by or through a processor 17 of the unit 10, to be further discussed for performing one or more functions and operations of the unit 10, such as supplying information regarding AC refrigerant charge capacity for various vehicles or verifying or accepting a replaceable component part according to aspects of the invention. The database input 19 can also receive and communicate information or data on the group or groups of a plurality of the acceptable or valid identifiers 14 corresponding to a replaceable part or component to which a component identification method and system of the present invention is applicable.

The database input or interface 19 allows the unit 10 to connect to an external device, such as, but not limited to, a computing device, an external communication device (such as a modem), a network, etc. through a wired or wireless connection, such as BLUETOOTH, an infrared device, a wireless fidelity (WiFi, e.g. 802.11), etc. Database input or interface 19 can also include connections such as a USB (universal serial bus), FIREWIRE (Institute of Electrical and Electronics Engineers (IEEE) 1394), modem, RS232, RS48J, and other connections to communicate with external devices, such as a hard drive, USB drive, CD player, DVD player, or other computer readable medium devices.

The control panel 16 also includes a keypad 20, such as including an alpha-numeric keypad 21, for entering information or selecting various functions or performing various operations of the unit 10. The keypad 20 of control panel 16 includes a menu selection button 22 and associated navigation keys 24 to select and perform various functions and operations of the unit 10, such as a component identification operation of the present invention.

The keypad 20 of the control panel 16 also includes a plurality of keypad function buttons 26 to perform various functions of the unit 10, such as performing an automatic recover, leak test and charge sequence, a recovery sequence, a vacuum sequence, an inject oil sequence, an AC charge sequence, or accessing a database, or other suitable function, for example. Also, the illustrated key pad 20 has a start/yes button 28 and a stop/no button 29 for commencing, pausing or terminating a function, or to respond to an inquiry, such as can be utilized in a component identification operation of the present invention for replacing the filter 12 of the unit 10.

As illustrated in FIG. 4, the control panel 16 communicates with the processor 17, such as through a line or bus 30, for performing the functions of the unit 10, including those related to accepting or validating a replacement part, according to aspects of the invention. The processor 17 can be any suitable device, such as an application specific integrated circuit (ASIC), a central processing unit (CPU), a microprocessor, microcontroller, a field programmable gate array (FPGA), or complex programmable logic device (CPLD), or other suitable processor or processing device, with associated memory or programming, for controlling or performing the operations of the unit 10 and the processes of validating or accepting a replacement part or component, according to aspects of the invention.

The memory storage unit 15 communicates, receives or stores data, software and programs for operation of the unit 10, including those data, software or programs related to accepting or validating a replacement part or component, according to aspects of the invention. The memory storage unit 15, such as in a non-volatile memory, can provide, for example, storage for boot code, self-diagnostics, various drivers and software to run the unit 10. The memory storage unit 15 can communicate software, programs or data with the processor 17, such as through a line or bus 32. The memory storage unit 15 and the processor 17 (as indicated by the numeral 17a) can include an internal non-volatile memory (NVM), a read only memory (ROM), a random access memory (RAM), a dynamic random access memory (DRAM), a programmable read only memory (PROM), an erasable programmable read-only memory (EEPROM), a flash ROM, or other similar memory.

The memory storage unit 15 can also include, for the unit 10 or for other suitable systems or apparatus to which the present invention can be applied, a hard drive or a card reader, such as for, but not limited to, a compact flash card, floppy disk, memory stick, secure digital, flash memory or other type of memory. The memory card reader, for example, can be a reader that reads more than one of the aforementioned memory such as a combination memory card reader. Additionally, the card reader or hard drive can also, for example, read any other computer readable medium, such as CD (compact disc), DVD (digital video or versatile disc), etc.

The component identification system and method of present invention can be realized as computer-executable instructions in computer-readable media, such as can be associated or incorporated with the memory storage unit 15, and can be provided to and executed by the unit 10 or to other suitable systems or apparatus, according to aspects of the invention. The computer-readable media includes all possible kinds of media in which computer-readable data is stored or included or can include any type of data that can be read by a computer or a processing unit. The computer-readable media include for example and not limited to storing media, such as magnetic storing media (e.g., ROMs, floppy disks, hard disk, and the like), optical reading media (e.g., CD-ROMs (compact disc-read-only memory), DVDs (digital versatile discs), re-writable versions of the optical discs, and the like), hybrid magnetic optical disks, organic disks, system memory (read-only memory, random access memory), non-volatile memory such as flash memory or any other volatile or non-volatile memory, other semiconductor media, electronic media, electromagnetic media, infrared, and other communication media such as carrier waves (e.g., transmission via the Internet or another computer). Communication media generally embodies computer-readable instructions, data structures, program modules or other data in a modulated signal such as the carrier waves or other transportable mechanism including any information delivery media.

Computer-readable media such as communication media may include wireless media such as radio frequency, infrared microwaves, and wired media such as a wired network. Also, the computer-readable media can store and execute computer-readable codes that are distributed in computers connected via a network. The computer readable medium also includes cooperating or interconnected computer readable media that are in the processing system or are distributed among multiple processing systems that may be local or remote to the processing system. The present invention can include the computer-readable medium having stored thereon a data structure including a plurality of fields containing data representing the techniques and processes of the component identification systems and methods of the present invention.

Continuing with reference to FIG. 3, FIG. 3 is a perspective view of the filter 12, identified as a replacement filter 12b, for replacement of the filter 12a in the AC recovery unit 10 illustrated in FIG. 2. According to aspects of the invention, a replaceable component or part, such as filter 12, has the identifier 14 associated with the replaceable component or part. The identifier 14 identifies a particular replaceable part or component from others of a plurality of replaceable parts or components, such as to distinguish each replaceable component or part from others of the same or similar type.

FIGS. 2 and 3 illustrate the identifier 14 associated with the Filter 12 by being positioned or affixed on the filter 12. However, the identifier can be associated with the filter 12 by various other suitable arrangements or methods, such as by being located on the packaging container, or included with material provided with the filter 12, for example.

Continuing with reference to FIGS. 1 through 3, with respect to the AC recovery unit 10 of FIGS. 1 and 2, each filter 12, such as filters 12a and 12b, of a plurality of filters 12, is identified by or associated with a unique or different identifier 14 to distinguish it from others of the filters 12 that can be used as a replacement part or component in the AC recovery unit 10. According to aspects of the invention, use of such identifier 14 ensures that a new, acceptable or correct replacement part or component is installed in the apparatus or system, such as the AC recovery unit 10, and that a previously used component or part, such as a previously used filter 12, is not reused.

The identifier 14 can, for example, be a listing, sequence, pattern, or other suitable arrangement, of elements, such as numbers, letters, symbols, digits or other suitable elements, or combinations thereof. Further, according to aspects of the invention, the elements included in the identifier 14 can be correlated or related, by a functional, arithmetical, logical, algorithmic, or other suitable relationship or definition, to provide an added level of security and integrity for ensuring that an acceptable, correct or unused component or part is installed. Thus, according to aspects of the invention, a software definition can be provided to check or verify the identifier 14 for acceptability or correctness controlled by the unit's, such as the AC recovery unit 10's, microprocessor based control.

For example, identifier 14 associated with the filter 12 of the AC recovery unit 14 is an alpha-numeric combination of letters and numbers, with each identifier 14 being unique or different for each filter 12 from that of other identifiers 14 for a group or groups of a plurality of filters 12. In the identifier 14 illustrated in FIG. 3, the illustrated filter 12b for use in the AC recovery unit 10 is identified by the identifier 14 of "AB123Z", while the filter 12a to be replaced is, for example, identified by a different identifier 14, such as "CZX568".

Also, as previously mentioned, according to a further aspect of the invention, for added security and integrity, the elements forming the identifier 14 can be related by a functional, arithmetical, logical, algorithmic, or other suitable relationship or definition, such as by a serial number scheme or code, thereby providing a further validation operation to ensure the component to be replaced, such as the filter 12a, has been replaced by an acceptable, unused component, such as filter 12b.

In this regard, according to aspects of the invention, an example of a validation operation, among suitable validation operations, is a validation operation using a serial number or code scheme for the identifier 14, such as a ten digit or element serial number, for the identifier 14. The digits or elements forming the serial number or code are grouped into a plurality of parts or portions, such as by using an alpha-numeric combination of elements in a hexadecimal type format. Also, for example, a validation operation can include comparing the identifier 14 with one or more listings or groups including valid and acceptable identifiers, such as groups or listings including identifiers used or to be used and that are respectively associated for identification of acceptable parts or components, such as for filters 12.

For example, one or more parts or portions of the identifier 14 can correlate with or accommodate a maximum or total number of components or parts, such as the total number of filters 12, which are or to be each identified by a unique or different identifier 14, such as by using a serial number scheme or arrangement in a hexadecimal format, for example. The other part or portion, or other parts or portions, of the identifier 14, can be a combination of results of multiple arithmetic, algorithmic operations between the digits or elements in the first part or portion of the identifier 14.

As a further example of a validation operation, according to aspects of the invention, the digits or elements of the identifier 14 forming a serial number or code scheme can include paired element or digit groupings correlated in an algorithmic, arithmetic relation. For example, the paired elements or digit groupings AA, BB, CC, DD, and EE can be in a relation such as AA, BB, CC, DD=MOD ((AA+BB),CC), EE=QUOTIENT ((AA+BB),CC)) or AA, BB, CC, DD=MOD ((AA+CC),BB), EE=QUOTIENT ((AA+CC),BB)) or other suitable relation. Another example of such type of validation operation including the paired elements or digit groupings AA, BB, CC, DD, and EE in a component identification system and method of the present invention using arithmetic operations is illustrated and discussed with respect to the exemplary embodiment illustrated in FIG. 6, although the invention is not limited in this regard.

Figure 5:
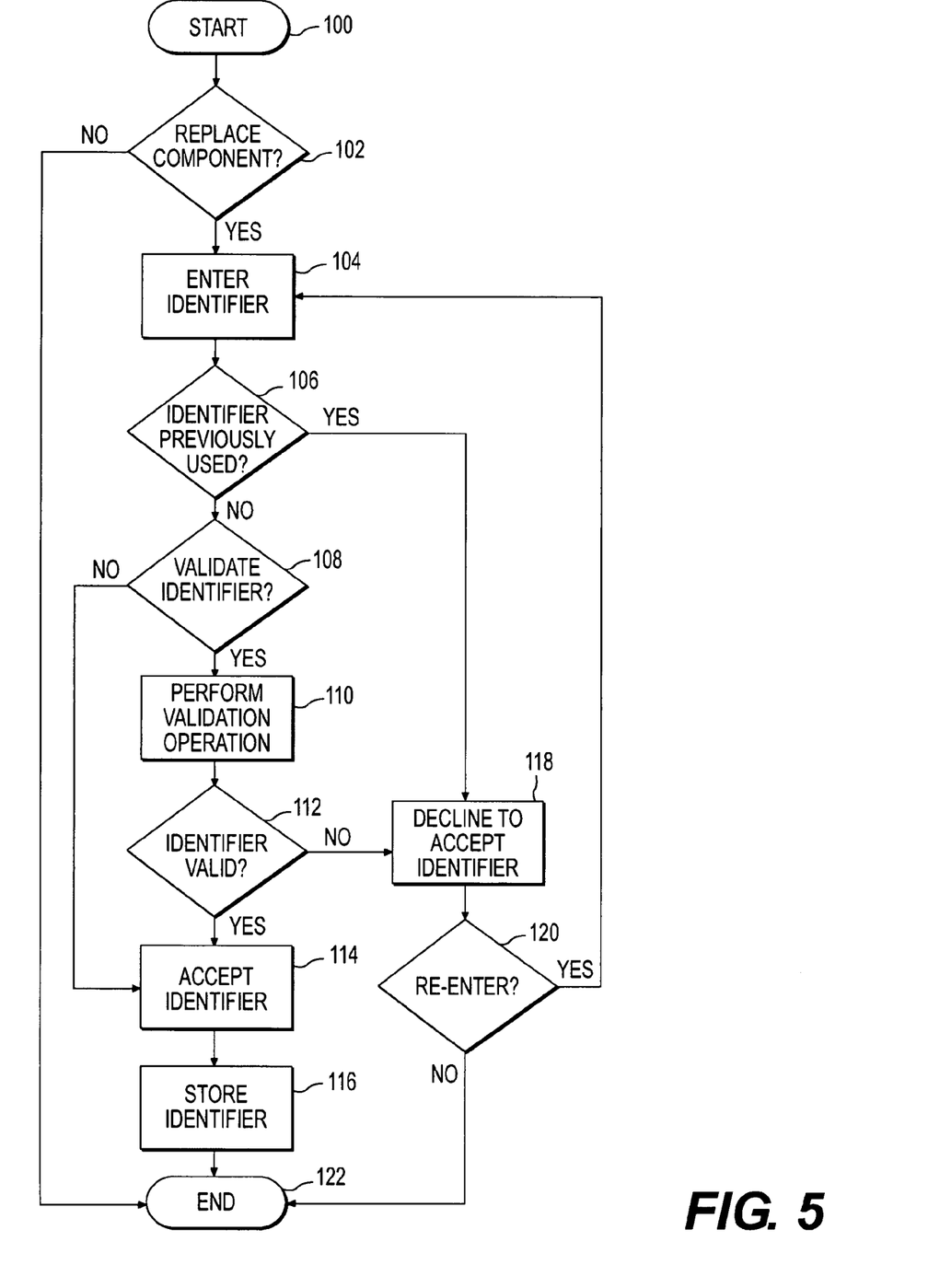
FIG. 5 is a flowchart illustrating steps or operations that can be followed in accordance with exemplary embodiments of a component identification method and system of the present invention.

Referring now to the flowchart of FIG. 5, exemplary processes and operations, according to aspects of the invention, are illustrated for component identification methods and systems of the present invention. The processes and operations of FIG. 5 are described, by way of example, with reference to the filter 12 of the AC recovery unit 10, as the replaceable component or part, although the invention is not limited in this regard.

In FIG. 5, the process starts with operation 100, under control of the processor 17 communicating with the memory storage unit 15. In operation 100, for example, the unit 10 displays a message on the display 18 to replace filter 12, or a change filter operation is selected by the menu selection button 22 and associated navigation keys 24.

In operation 102, a message is displayed on the display 18 requesting a decision as to replacement of the filter 12, such as the filter 12a in unit 10, with a replacement component, such as filter 12b of FIG. 3. The user in operation 102 also decides whether or not to proceed with the component replacement. To proceed with component replacement, the user presses the start/yes button 28 and the process proceeds to operation 104. In order not to proceed with component replacement, the user presses the stop/no button 29 to indicate a decision not to replace the component and the process proceeds to end at step 122.

At operation 104, the identifier for the replacement component or part to be installed in the system or apparatus is entered, such as the identifier 14 for the filter 12b to be installed in the unit 10. The identifier is entered, such as by using the keypad 21 on the control panel 16. The process then proceeds to operation 106 where the identifier 14, such as by a validation operation, is compared by the processor 17 with one or more identifiers 14 for a previously installed or used component corresponding to the replacement component, such as that for filter 12a stored in the memory storage unit 15. Where the identifier 14 entered matches an identifier of a previously used component, the process proceeds to operation 118 where the entered identifier is declined acceptance for installation and a message indicating that acceptance is declined is displayed on display 18.

The process then proceeds to operation 120 to determine whether to re-enter another identifier 14, such as where the identifier 14 is initially entered incorrectly. Where it is determined to reenter the identifier 14, the user presses the start/yes button 28 and the process proceeds back to operation 104. To not proceed with reentry of the identifier 14, the user presses the stop/no button 29 to indicate a decision not to proceed with reentry of the identifier, and the process proceeds to end at step 122. Alternatively, operation 120 can be omitted and the process can proceed from operation 118 to end at operation 122.

Where the identifier entered at operation 104 is determined to not match an identifier of a previously installed component at operation 106, the process then proceeds to operation 108. At operation 108 it is determined whether a further validation operation is to be performed on the identifier for the replacement component, such as the identifier 14 for the replacement filter 12b.

Such further validation operation or operations can be desirable, such as to determine whether the component to be installed, such as the filter 12b, is a genuine or acceptable component for installation in the apparatus or system, such as the unit 10. Typically, one or more predetermined validation operations is/are performed, according to aspects of the invention, to insure the replacement component is acceptable or genuine, such as to ensure it meets certain performance specifications or criteria, to promote proper operation and function in the system or apparatus in which it is to be installed.

Where it is determined not to perform a further validation operation or operations at operation 108, the process proceeds to operation 114 to accept the entered identifier 14, and the process then proceeds to operation 116 to store the entered accepted identifier 14, such as in the memory storage unit 15 of the unit 10. After storage of the identifier 14 in operation 116, the process then proceeds to end at operation 122.

However, where it is determined one or more other validation operations is/are to be performed at operation 108, the process then proceeds to operation 110. At operation 110 one or more predetermined validation operations is/are performed on the entered identifier 14, such as to determine whether the identifier associated with the replacement component is a valid identifier and the replacement component associated with the entered identifier 14 is acceptable or genuine. As previously discussed, the validation operation or operations performed at operation 110 can compare one or more of the elements, such as numbers or letters, with other of the elements forming the identifier 14, such as by applying a functional, arithmetical, logical, algorithmic, or other suitable relationship or definition, such as by a serial number scheme or code, to determine whether they conform or correspond to such functional, arithmetical, logical, algorithmic, or other suitable relationship or definition.

Also, for example, at operation 110, the validation operation can include, as previously discussed, comparing the identifier 14 with one or more listings or groups, such as can be stored by the memory storage unit 15, including valid and acceptable identifiers, such as groups or listings including identifiers used or to be used and that are respectively associated for identification of acceptable parts or components, such as for filters 12. One such group or groups for comparison can include serial numbers to be respectively associated with the replaceable components or parts, such as for filters 12.

Where one or more validation operations are performed at operation 110, the process then proceeds to operation 112, where it is determined whether the entered identifier 14 is valid based upon the result or results of the one or more validation operations performed at operation 110. Where the identifier is determined to be a valid identifier at operation 112, the process then proceeds to operation 114 to accept the entered identifier 14, and the process then proceeds to operation 116 to store the entered accepted identifier 14, such as in the memory storage unit 15 of the unit 10. After storage of the identifier 14 in operation 116, the process then proceeds to end at operation 122.

On the other hand, where the identifier is determined to be an invalid identifier at operation 112, the process then proceeds to operation 118 where the entered identifier is declined acceptance, such as to not permit installation of the component associated with the identifier, and a message indicating the acceptance is declined is displayed on display 18.

At operation 118, the process then proceeds to operation 120 to determine whether to re-enter another identifier 14, such as where the identifier 14 is initially entered incorrectly. Where it is determined to reenter the identifier 14, the user presses the start/yes button 28 and the process proceeds back to operation 104. To not proceed with reentry of the identifier 14, the user presses the stop/no button 29 to indicate a decision not to proceed with reentry of the identifier, and the process proceeds to end at step 122. Alternatively, as previously mentioned, operation 120 can be omitted and the process can proceed from operation 118 to end at operation 122.

Figure 6:
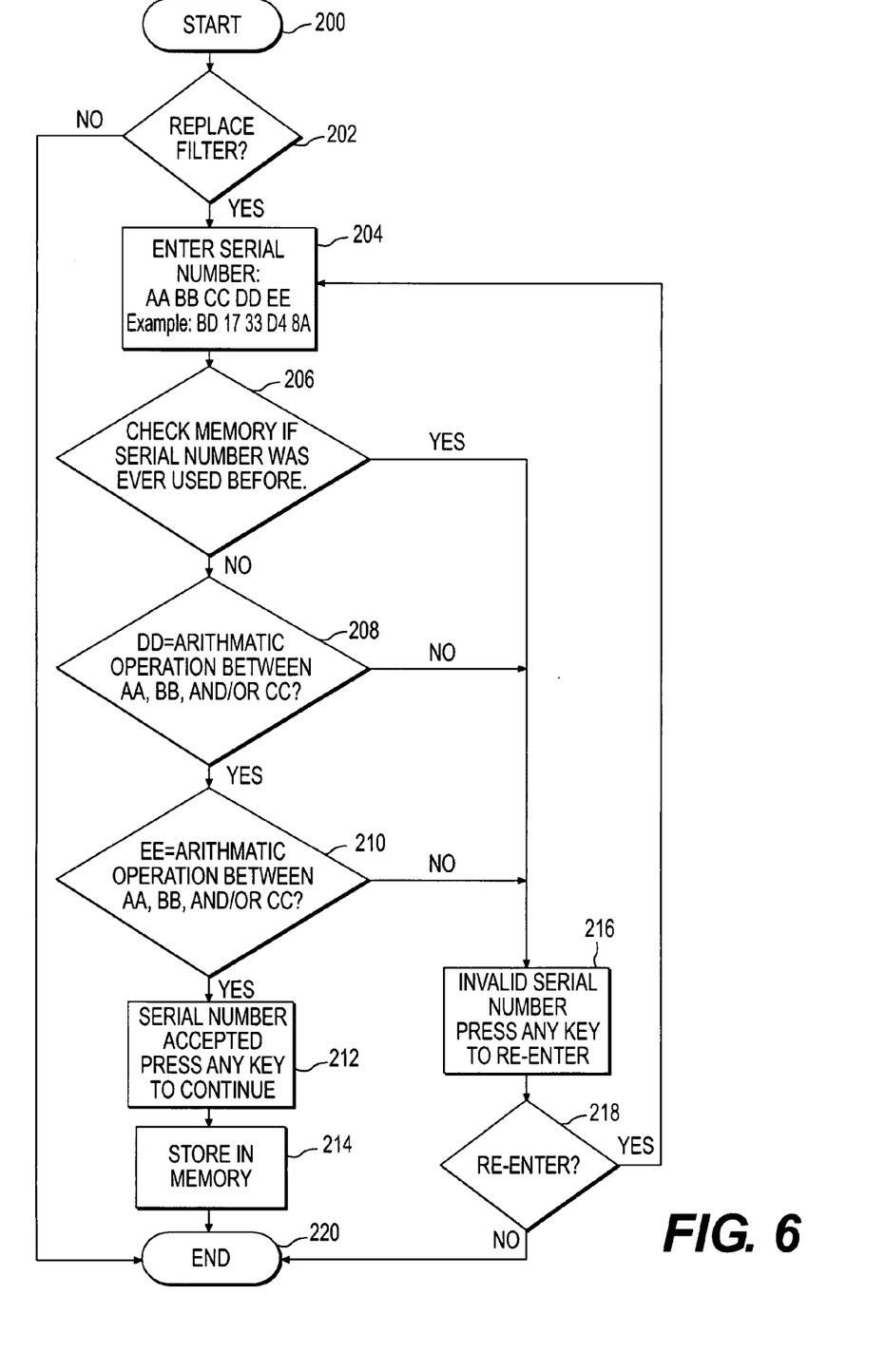
FIG. 6 is a flowchart illustrating steps or operations that can be followed in accordance with an exemplary embodiment of a component identification method and system of the present invention utilizing a filter serial number scheme.

Continuing now with reference to the flowchart of FIG. 6, an exemplary process and operation are illustrated for a component identification method and system, according to aspects of the invention, utilizing an example of a filter serial number scheme or code scheme for component identification and validation and acceptance. The processes and operations of FIG. 6 are described, by way of example, with reference to the filter 12 of the AC recovery unit 10, as the replaceable or replacement component or part, although the invention is not limited in this regard.

In FIG. 6, the process starts with operation 200, under control of the processor 17 communicating with the memory storage unit 15. In operation 200, for example, the unit 10 displays a message on the display 18 to replace filter 12, or a change filter operation is selected by the menu selection button 22 and associated navigation keys 24.

In operation 202, a message is displayed on the display 18 requesting a decision as to replacement of the filter 12, such as the filter 12a in unit 10, with a replacement component, such as filter 12b of FIG. 3. The user in operation 202 also decides whether or not to proceed with the component replacement. To proceed with component replacement, the user presses the start/yes button 28 and the process proceeds to operation 204. In order not to proceed with component replacement, the user presses the stop/no button 29 to indicate a decision not to proceed with replacement of the component, and the process then proceeds to end at step 220.

At operation 204, the identifier 14 for the replacement component or part to be installed in the system or apparatus is entered, such as the identifier 14 for the filter 12b to be installed in the unit 10. The identifier is entered, such as by using the keypad 21 on the control panel 16.

In the example described in the flow chart of FIG. 6, the entered identifier 14 at operation 204 is a serial number of a component or part, such as for a filter 12. The serial number is divided into five pairs, AA, BB, CC, DD and EE, of the elements or digits forming the serial number. In the example serial number, "BD 17 33 D4 8A", illustrated in the block for operation 204, "BD" corresponds to first pair AA, "17" corresponds to the second pair BB, "33" corresponds to the third pair CC, "D4" corresponds to the fourth pair DD and "8A" corresponds to the fifth pair EE. These numbers forming the serial number, "BD, 17, 33, D4, and 8A", are in hexadecimal format and, once decoded to decimal numbers, correspond to 189, 23, 51, 212, and 138, respectively.

The process then proceeds to operation 206 where the entered serial number as the identifier 14 is compared through a validation operation by the processor 17 with one or more serial number identifiers 14 for one or more previously installed or used components corresponding to the replacement component, such as that for filter 12a stored in the memory storage unit 15. Where the serial number identifier 14 entered at operation 204 matches a serial number identifier 14 of a previously used component corresponding to the replacement component at operation 206, the process then proceeds to operation 216 where the entered serial number identifier is declined for acceptance as an invalid serial number, and a message indicating that acceptance of the entered serial number identifier 14 is declined is displayed on display 18.

The process then proceeds to operation 218 where it is determined whether to re-enter another serial number identifier 14, such as where the identifier 14 is initially entered incorrectly. Where it is determined to reenter the serial number identifier 14, the user can press the start/yes button 28, or can alternatively press any key on the keypad 21, and the process then proceeds back to operation 204. Where it is determined not to proceed with reentry of the serial number identifier 14, the user can press the stop/no button 29 to indicate a decision not to proceed with reentry of the identifier, or can alternatively decline to press the stop/no button 29 or decline to press any key of the keypad 21 to indicate after a predetermined time a decision not to proceed with reentry of the serial number identifier 14, and the process then proceeds to end at operation 220. Alternatively, operation 218 can be omitted and the process can proceed from operation 216 to end at operation 220.

Where the serial number identifier 14 entered at operation 204 is determined, by a validation operation, such as by a comparison operation, to not match a serial number identifier 14 of a previously installed component, such as for a previously used filter 12, at operation 206, the process then proceeds to operation 208.

At operation 208 a further validation operation through an exemplary algorithm, such as a correlation algorithm, is performed on the entered serial number identifier 14 to determine whether the entered serial number identifier 14 is valid. In the further validation operation, in the exemplary algorithm, the first three number pairs AA, BB, CC corresponding to the first three pairs "BD 17 33" of the entered serial number identifier 14 are typically random numbers and can be any numbers in a hexadecimal format, for example. Typically, a hexadecimal format for the numbers forming the pairs of the entered serial number can be provided to accommodate a unique or different serial number for each of a relatively large group of components, according to aspects of the invention, although other numbering formats and schemes can also be used, according to aspects of the invention. Also, in the serial number scheme for the identifier 14 to which the exemplary algorithm is applied, the first number pair AA is set to be greater in value than the third number pair CC, for example.

In the further validation operation at operation 208, the fourth number pair DD, applying the exemplary algorithm, is the result of an arithmetic operation, such as an addition operation between one or more of the first, second or third number pairs AA, BB and/or CC of the entered serial number identifier 14. In the exemplary algorithm, the fourth number pair DD corresponds to the sum of the first number pair AA and the second number pair BB for a valid entered serial number identifier 14, for example.

At operation 208 the addition operation is applied to the exemplary serial number identifier 14 in a hexadecimal format, "BD 17 33 D4 8A", and, for a valid serial number identifier 14, where "BD" and "17" (first number pair AA and second number pair BB) are added, then the result of the addition should correspond to or equal "D4" (fourth number pair DD). Converting the hexadecimal numbers forming the number pairs of the example serial number identifier 14 to a decimal format, it is determined at operation 208 that the example serial number identifier 14, "BD 17 33 D4 8A", in hexadecimal format meets the further validation operation, in that "D4" converts to decimal "212", "BD" converts to decimal "189" and "17" converts to decimal "23", with 189+23=212.

Where the further validation operation is met at operation 208, as for the example serial number identifier 14, "BD 17 33 D4 8A", the process then proceeds to operation 210 where an additional validation operation is performed as a further check on the validity or integrity of the serial number identifier 14 for the component or replacement part, to be installed, such as for the filter 12. Where the further validation operation is not met at operation 208, the process then proceeds to operation 216 and proceeds as previously described.

In the additional validation operation at operation 210, the fifth number pair EE, applying the exemplary algorithm, is the result of an arithmetic operation, such as subtraction operation between one or more of the first, second or third number pairs AA, BB and/or CC of the entered serial number identifier 14. In the serial number scheme for the identifier 14 to which the exemplary algorithm is applied, for example, the fifth number pair EE corresponds to the difference obtained by subtracting the third number pair CC from the first number pair AA for a valid entered serial number identifier 14, for example.

At operation 210, the subtraction operation is applied to the exemplary serial number identifier 14 in a hexadecimal format, "BD 17 33 D4 8A", and, for a valid serial number identifier, where "33" is subtracted from "BD" (the third number pair CC is subtracted from the first number pair AA), then the result of the subtraction should correspond to or equal "8A" (fifth number pair EE). Converting the hexadecimal numbers forming the number pairs of the example serial number identifier 14 to a decimal format, it is determined at operation 210 that the example serial number identifier "BD 17 33 D4 8A" in hexadecimal format meets the additional validation operation, in that "8A" converts to decimal "138", "BD" converts to decimal "189" and "33" converts to decimal "51", with 133=189−51.

Where the second validation operation is met at operation 210, as for the aforementioned example serial number identifier 14, "BD 17 33 D4 8A", the process then proceeds to operation 212 to accept the entered serial number identifier 14, and by pressing any key on the keypad 21, for example, the process then proceeds to operation 214 to store the entered accepted serial number identifier 14, such as in the memory storage unit 15 of the unit 10. After storage of the accepted serial number identifier 14 in operation 214, the process then proceeds to end at operation 220. Where the second validation operation is not met at operation 210, the process then proceeds to operation 216 and proceeds as previously described.

According to aspects of the invention, the component identification system, apparatus and method of the present invention therefore provides for checking the integrity of identifier, such as the serial number/unlocking code associated with the component or part to be installed, and verifies that a user has received a valid replacement component or part, such as the filter 12, for installation in the system or apparatus, such as the AC recovery unit 10.

Although examples of the component identification system and apparatus and methods of the present invention have been shown and described using a filter for an AC recovery unit, it will be appreciated that the component identification system and method of the present invention can also be applied to other items, such as where ensuring the integrity of proper component replacement is or can be important, such as in medical or pharmaceutical devices or systems, or in gas or liquid containment systems, for example. Also, although the component identification system, apparatus and methods are useful to insure the integrity of component parts in the automotive industry, such as for AC recovery units, the present invention can also be used to do other things and/or used in other industries.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. An air conditioning (AC) recovery unit, comprising:
a display of the AC recovery unit configured to prompt a user to replace an AC filter in need of replacement;
a memory of the AC recovery unit configured to store a first list of one or more identifiers for each AC filter that was previously used in the AC recovery unit, and a second list of identifiers associated with approved replacement AC filters;
an input device of the AC recovery unit configured to receive an identifier of a replacement AC filter; and
a processor configured to compare a portion of the identifier of the replacement AC filter with the second list of identifiers associated with the approved replacement AC filters and with the first list of one or more stored identifiers for each AC filter that was previously used in the AC recovery unit, wherein
the replacement AC filter is acceptable when the portion of the identifier of the replacement AC filter differs from the one or more stored identifiers on the first list of each AC filter that was previously used in the AC recovery unit and the portion of the identifier of the replacement AC filter matches one of the identifiers stored on the second list indicating that the replacement AC filter is approved and when the replacement component is acceptable, the processor causes the accepted identifier to be stored in the first list, and
the replacement AC filter is unacceptable when the portion of the identifier of the replacement AC filter corresponds to one or more stored identifiers on the first list of each AC filter that was previously used in the AC recovery unit or the portion of the identifier of the replacement AC filter does not match one of the identifiers stored on the second list, and when the replacement component is unacceptable, the processor causes the display to indicate that the replacement AC filter is not accepted, wherein the processor is further configured to allow reentry of the identifier of the replacement AC filter when the identifier was initially entered incorrectly.

2. The air conditioning (AC) recovery unit of claim 1, wherein the processor prior to accepting the identifier of the replacement AC filter performs one or more predetermined validation operations on the identifier to determine acceptability of the replacement AC filter.

3. The air conditioning (AC) recovery unit of claim 2, wherein the identifier of the replacement AC filter includes a plurality of elements, and the second list further includes the plurality of elements,
wherein the processor determines that the replacement AC filter is acceptable when the plurality of elements of the identifier of the replacement AC filter matches the plurality of elements on the second list, and
wherein the processor determines that the replacement AC filter is unacceptable when the plurality of the elements of the identifier of the replacement AC filter does not match the plurality of elements on the second list.

4. The air conditioning (AC) recovery unit of claim 1, wherein the identifier of the replacement AC filter includes a plurality of elements, with one or more elements of the identifier indicating a total number of replacement AC filters to be associated with a corresponding identifier.

5. The air conditioning (AC) recovery unit of claim 1, wherein the identifier comprises a serial number in a hexadecimal format.

6. The air conditioning (AC) recovery unit of claim 5, wherein the identifier of the replacement AC filter includes a plurality of elements, and the second list further includes the plurality of elements,
wherein the processor prior to accepting the identifier of the replacement AC filter performs one or more predetermined validation operations on the identifier to determine acceptability of the replacement AC filter,
wherein the processor determines that the replacement AC filter is acceptable when the plurality of the elements of the identifier of the replacement AC filter matches the plurality of elements on the second list, and
wherein the processor determines that the replacement AC filter is unacceptable when the plurality of the elements of the identifier of the replacement AC filter does not match the plurality of elements on the second list,
wherein the processor prior to accepting the identifier of the replacement AC filter performs one or more predetermined validation operations on the identifier of the replacement AC filter.

7. The air conditioning (AC) recovery unit of claim 1, wherein the identifier comprises a serial number in a hexadecimal format.

8. An Air Conditioning (AC) recovery unit, comprising:
means for displaying configured to prompt a user to replace an AC filter in need of replacement;
means for storing configured to store a first list of one or more identifiers for each AC filter that was previously used in the AC recovery unit, and a second list of a plurality of identifiers associated with approved replacement AC filters;
means for inputting into the AC recovery unit configured to receive an identifier of a replacement AC filter; and
means for comparing configured to compare a portion of the identifier of the replacement AC filter with the second list of the plurality of identifiers associated with the approved replacement AC filters and the first list of identifiers for each AC filter that was previously used in the AC recovery unit wherein:
the replacement AC filter is determined acceptable when the portion of the identifier of the replacement AC filter differs from the one or more identifiers stored on the first list for each AC filter that was previously used in the AC recovery unit and the portion of the identifier of the replacement AC filter matches one of the plurality of identifiers stored on the second list indicating that the replacement AC filter is approved and when the replacement component is acceptable, the means for comparing causes the accepted identifier to be stored in the first list, and
the replacement AC filter is determined unacceptable when the portion of the identifier of the replacement AC filter corresponds to one or more stored identifiers in the first list for each AC filter previously used in the AC recovery unit or the portion of the identifier of the replacement AC filter does not match one of the plurality of the identifiers associated with the approved replacement AC filter stored in the second list, and when the replacement component is unacceptable, the means for comparing causes the means for displaying to indicate that the replacement AC filter is not accepted, wherein the means for comparing is further configured to allow reentry of the identifier of the replacement AC filter when the identifier was initially entered incorrectly.

9. The air conditioning (AC) recovery unit of claim 8, wherein the identifier comprises a serial number in a hexadecimal format.

\* \* \* \* \*